United States Patent Office 2,832,780
Patented Apr. 29, 1958

2,832,780

HYDRAZIDES OF PYRIDAZONYL-SUBSTITUTED ALKANOIC ACIDS

John A. King, Manhasset, N. Y., assignor to Warner-Lambert Pharmaceutical Company, New York, N. Y., a corporation of Delaware No Drawing. Application September 14, 1955
Serial No. 534,385

8 Claims. (Cl. 260—250)

This invention relates to a new class of compounds which are of value as pharmaceuticals, especially as wound healing agents.

The new compounds of my invention are represented by the following generic formula:

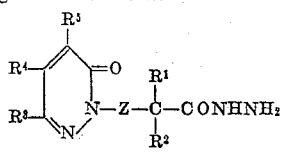

wherein $R^1$ denotes hydrogen or lower alkyl
$R^2$ denotes hydrogen, lower alkyl or phenyl
$R^3$ denotes hydrogen, halogen, lower alkyl, phenyl or halophenyl
$R^4$ denotes hydrogen, halogen or lower alkyl
$R^5$ denotes hydrogen, halogen or lower alkyl and Z denotes a direct linkage, an unsubstituted alkylene chain containing not more than 20 carbon atoms, or a lower alkyl-substituted alkylene chain containing not more than 20 carbon atoms.

The new compounds of my invention may be prepared in accordance with the following general scheme:

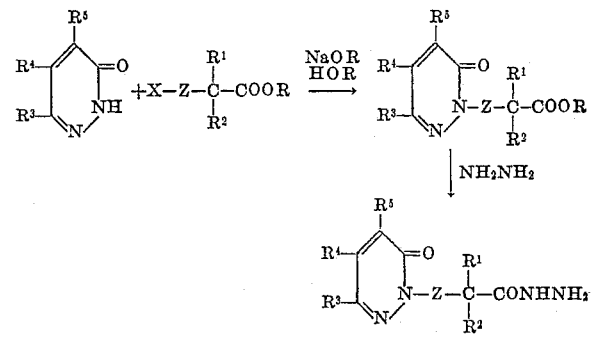

wherein $R^1$, $R^2$, $R^3$, $R^4$, $R^5$ and Z are as indicated above, R is lower alkyl and X is halogen.

The pyridazone derivatives used as starting materials in the scheme indicated above are prepared by various methods depending upon the nature of the substituents in the pyridazone nucleus. These methods are discussed below; and in the reaction schemes shown the methyl radical is used as an illustration of the lower alkyl radical; however the said methyl radical may be replaced by hydrogen or by other lower alkyl radicals without prejudicing the operability of the said reaction schemes.

The said pyridazone derivatives of the formula

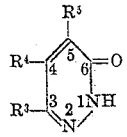

are prepared by the following methods:

*Method A.*—$R^3=R^4=R^5=H$. This pyridazone is obtained by the method described in Ber. 42, 654 (1909).

*Method B.*—$R^3=CH_3$ and $R^4=R^5=H$. This pyridazone is obtained by the method described in J. Chem. Soc., 239 (1947).

*Method C.*—$R^3=R^5=H$, $R^4=CH_3$. This pyridazone is obtained as follows:

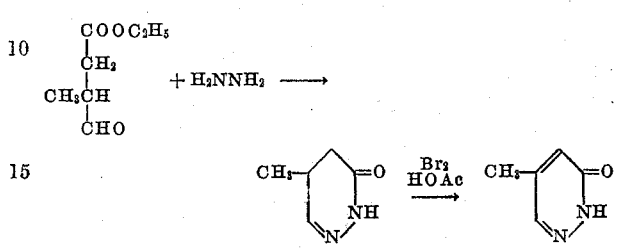

*Method D.*—$R^3=R^4=H$, $R^5=CH_3$.

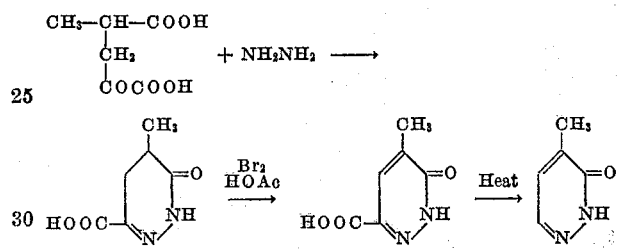

This compound may be alternatively prepared by method D'.

*Method D'.*—

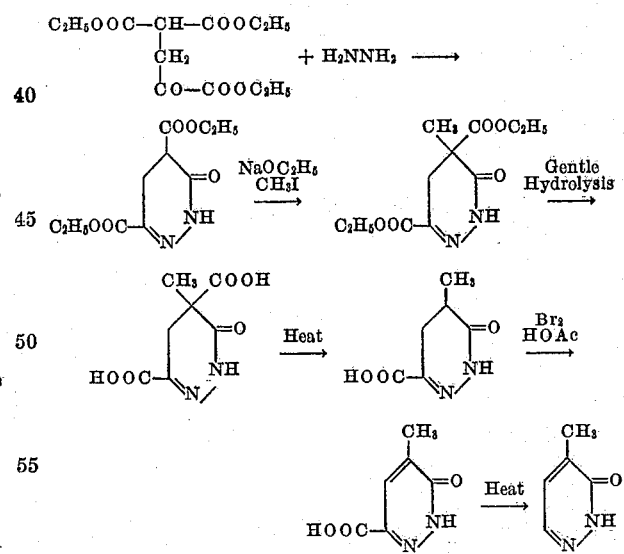

*Method E.*—$R^3=R^4=CH_3$, $R^5=H$. This pyridazone may be obtained as follows:

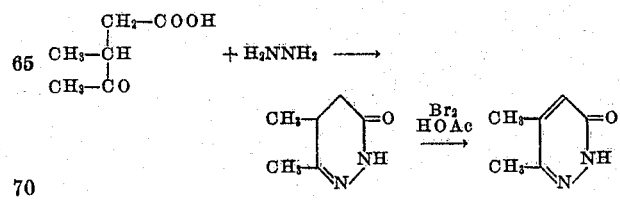

*Method F.*—$R^3=R^5=CH_3$, $R^4=H$ [see Gazz. chim, ital. 70, 768 (1940)]. This pyridazone is prepared as follows:

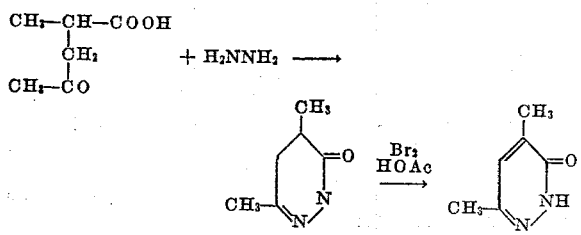

*Method G.*—R³=H, R⁴=R⁵=CH₃. This pyridazone is prepared as follows:

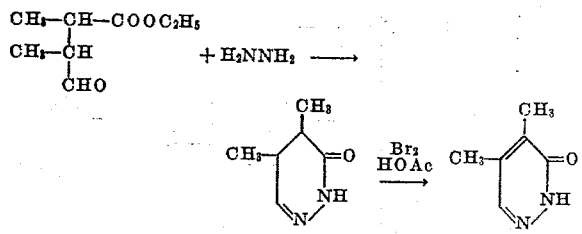

*Method H.*—R³=R⁴=R⁵=CH₃. This pyridazone is prepared as follows:

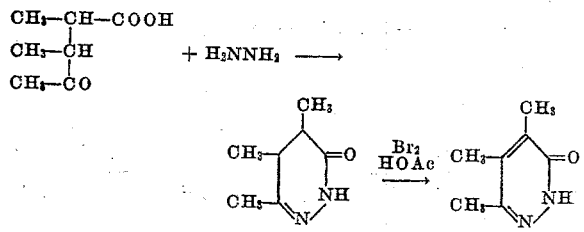

*Method I.*—R³=C₆H₅, R⁴=R⁵=H. This pyridazone is prepared by the method described in Ber. 32, 395 (1899).

*Method J.*—Halogeno-6-pyridazones are prepared by methods described in Helv. Chim. Acta 37, 121 (1954), 37, 837 (1954), and Ber. 32, 534 (1899).

3-phenyl-6-pyridazones and 3-halophenyl-6-pyridazones are prepared by prior art methods, as illustrated below.

The compounds of my invention were found to have the property of stimulating the growth of embryonic chick fibroblasts, thus making said new compounds of value as wound healing agents.

The following specific examples are illustrative of the products of my invention:

PREPARATION OF PYRIDAZONES

*Example 1.—5-methyl-6-pyridazone*

A solution of 3-carboxy-5-methyl-4,5-dihydro-6-pyridazone (32 g., 0.205 mole) [Bull. Soc. Chim. (4) 9, 451 (1911)] in 200 ml. of glacial acetic acid was heated to boiling and, with stirring, bromine (33.6 g., 0.21 mole) was added dropwise. After the addition was complete the mixture was heated at reflux for fifteen minutes and then diluted with 200 ml. of water and evaporated to dryness under vacuum. The residue was crystallized from 1500 ml. of water giving 28.0 g. of crystals melting at 275° C. (dec.); the thus obtained 3-carboxy-5-methyl-6-pyridazone (27 g., 0.175 mole) was heated at atmospheric pressure until the material was all melted after which it was distilled at 100 mm. pressure giving 16 g. of distillate; this distillate was crystallized from 350 ml. of benzene giving 10 g. (52% yield) of the desired material melting at 158–159° C.

*Example 2.—3,4-dimethyl-6-pyridazone*

A solution of β-methyllevulinic acid (13.0 g., 0.10 mole) [Bull. soc. chim. (3) 23, 920 (1900)] in 25 ml. of ethanol was mixed with a solution of hydrazine hydrate (5.0 g., 0.10 mole) in 25 ml. of ethanol. The resulting solution was evaporated to dryness under vacuum leaving 12.6 g. of crystalline 3,4-dimethyl-4,5-dihydro-6-pyridazone which melted at 98–108° C. A portion after two recrystallizations from Skellysolve C melted at 111.5–112.5° C. By the bromine dehydrogenation procedure described in Example 1 3,4-dimethyl-4,5-dihydro-5-pyridazone gave after crystallization from water an 81% yield of the desired 3,4-dimethyl-6-pyridazone melting at 225–228° C. A small sample after recrystallization from benzene melted at 232–233° C.

*Example 3.—3,5-dimethyl-6-pyridazone*

As described in Example 2 for the 3,4-dimethyl isomer, α-methyllevulinic acid and hydrazine in ethanol gave 3,5-dimethyl-4,5-dihydro-6-pyridazone melting at 59.5–62.5° C. A small portion after recrystallization from Skellysolve C melted at 62.5–63.5° C. A solution of 3,5-dimethyl-4,5-dihydro-6-pyridazone (10.0 g., 0.079 mole) in 75 ml. of glacial acetic acid was heated to boiling and bromine (12.9 g., 0.079 mole) was added dropwise to the stirred solution after which the mixture was heated at reflux for fifteen minutes. The reaction mixture was diluted with 75 ml. of water and evaporated to dryness under vacuum. The residue was crystallized from 10 ml. of water giving 3.0 g. of material which melted at 240° C. (dec.); this material which after recrystallization from a little methanol, melted at 255° C. (dec.) gave a strong ionic halogen test and was the hydrobromide of 3,5-dimethyl-6-pyridazone. The original water mother liquor was neutralized with sodium hydroxide solution and the neutral solution was evaporated to dryness under vacuum. The residue was boiled with 30 ml. of benzene and the resulting suspension was filtered. The chilled benzene filtrate gave 6.0 g. (61% yield) of 3,5-dimethyl-6-pyridazone melting at 126–128° C. A small sample after recrystallization from Skellysolve C melted at 130–131° C.

*Example 4.—3,4,5-trimethyl-6-pyridazone*

α,β-Dimethyllevulinic acid (14.4 g., 0.10 mole) [Ber., 44, 2191 (1911)] and hydrazine hydrate (5.0 g., 0.10 mole) were mixed in ethanol and the solution was evaporated to dryness under vacuum. The viscous residue was distilled giving a crystalline distillate of 3,4,5-trimethyl-4,5-dihydro-6-pyridazone boiling at 79° C./0.1 mm. which was recrystallized from Skellysolve B giving 8.5 g. of material melting at 85–86° C. A solution of 3,4,5-trimethyl-4,5-dihydro-6-pyridazone (57 g., 0.41 mole) in 250 ml. of glacial acetic acid was heated to boiling, and with stirring, bromine (65.5 g., 0.41 mole) was added dropwise to the solution. After the addition was complete the solution was heated at reflux for fifteen minutes after which the acetic acid was distilled off under vacuum. The residue was dissolved in 200 ml. of water and this solution was brought to pH 7 with sodium hydroxide solution. An orange-yellow solid precipitated which weighed 42 g. (74% yield) was melted at 238–245° C. A small sample after recrystallization from ethyl acetate and again from water melted at 249.5–250° C.

*Example 5.—3-ethyl-6-pyridazone*

A solution of 3-ethyl-4,5-dihydro-6-pyridazone (40.5 g., 0.322 mole) [Ber., 81, 1 (1948)] in 160 ml. of glacial acetic acid was heated to boiling and the solution was treated dropwise with bromine (52 g., 0.325 mole). After the addition was complete the mixture was heated under reflux for fifteen minutes. The reaction mixture was then diluted with 100 ml. of water and evaporated to dryness under vacuum. The residue was dissolved in 200 ml. of water and this solution was neutralized with sodium hydroxide solution after which the solution was evaporated to dryness under vacuum. The residue was boiled with 250 ml. of absolute ethanol and the sodium bromide removed by filtration. The alcohol was evaporated from the filtrate and the residue was distilled giving 17 g. (42.5%) of material which slowly crystallized. A small sample after recrystallization from Skellysolve B melted at 95° C.

PREPARATION OF PYRIDAZONYL-SUBSTITUTED ALKANOIC ESTERS

*Example 6.—Ethyl β-(3-methyl-6-pyridazonyl-1) propionate*

To a solution of sodium (12.7 g., 0.55 mole) in 450 ml. of absolute ethanol there was added 3-methyl-6-pyridazone (60.5 g., 0.55 mole). This solution was stirred at less than 20° C. while ethyl β-bromopropionate (100 g., 0.55 mole) was added dropwise. When the addition was complete the reaction mixture was heated under reflux for three hours after which it was cooled and filtered to remove sodium bromide. The ethanol was removed from the filtrate by distillation under vacuum and the residue was taken up in 250 ml. of benzene. The benzene solution was washed with three 100 ml. portions of water to remove residual sodium bromide and unreacted pyridazone after which the benzene was stripped off under vaccum and the residue was distilled giving 53.5 g. (46.5% yield) of material boiling at 124° C. (0.5 mm.).

*Example 7.—Ethyl ω-(3-methyl-6-pyridazonyl-1)undecanoate*

When ethyl ω-bromoundecanoate [J. Chem. Soc. 79, 1191 (1901)] was used to alkylate 3-methyl-6-pyridazone in a manner similar to that described in Example 6, there was obtained ethyl ω-(3-methyl-6-pyridazonyl-1)undecanoate in 47.5% yield boiling at 166–170° C. (.04 mm.).

*Example 8.—Ethyl α-(3-methyl-6-pyridazonyl-1)-n-butyrate*

By the same procedure as in Example 6, ethyl α-bromo-n-butyrate and 3-methyl-6-pyridazone gave ethyl α-(3-methyl-6-pyridazonyl-1)-n-butyrate in 79% yield boiling at 92° C. (.05 mm.).

*Example 9.—Ethyl α-(3-methyl-6-pyridazonyl-1)-n-valerate*

This ester was obtained from ethyl α-bromo-n-valerate in 82.5% yield boiling at 111° (0.15 mm.).

*Example 10.—Ethyl α-(3-methyl-6-pyridazonyl-1)-caproate*

This ester was obtained from ethyl α-bromo-n-hexanoate in 79.5% yield boiling at 117° (0.3 mm).

*Example 11.—Ethyl α-(3-methyl-6-pyridazonyl-1)-n-heptanoate*

This ester was prepared from ethyl α-bromo-n-heptanoate in 63% yield boiling at 129° (0.2 mm).

*Example 12.—Ethyl-α-phenyl-α-(3-methyl-6-pyridazonyl-1) acetate*

To a solution of sodium (15.5 g., 0.675 mole) in 700 ml. of absolute ethanol there was added with stirring 3-methyl-6-pyridazone (74.5 g., 0.675 mole). The reaction mixture was cooled to less than 10° C. while ethyl α-bromophenylacetate (164 g., 0.675 mole) was added dropwise. When the addition was complete, the reaction mixture was heated at 50° C. for one hour. The sodium bromide was filtered off while the reaction mixture was still hot. The filtrate was concentrated to 500 ml. under vacuum, heated to the boiling point and filtered. The chilled filtrate yielded crystals (69.5 g., 38%) which melted at 119–122° C. A small sample, recrystallized from absolute ethanol, melted at 121–123° C.

*Example 13.—Ethyl (5-methyl-6-pyridazonyl-1) acetate*

To a solution of sodium (6.9 g., 0.3 mole) in 300 ml. of absolute ethanol there was added 5-methyl-6-pyridazone (33 g., 0.3 mole). This solution was stirred at less than 10° C. while ethyl α-bromoacetate (50 g., 0.3 mole) was added dropwise. After the addition was complete, the reaction mixture was heated under reflux for one hour after which it was cooled and filtered to remove sodium bromide. The filtrate was evaporated to dryness under vacuum and the residue was dissolved in 250 ml. of benzene. The benzene solution was washed with two 100 ml. portions of water and was dried over anhydrous sodium sulfate. The benezene was evaporated under vacuum and the residue was crystallized from 300 ml. of Skellysolve C. The product weighed 24 g. (41% yield) and melted at 75–76° C.

*Example 14.—Ethyl (3,5-dimethyl-6-pyridazonyl-1) acetate*

By a procedure similar to that of Example 13, 3,5-dimethyl-6-pyridazone and ethyl bromoacetate gave this ester in 40% yield melting at 107–108° C.

*Example 15.—Ethyl (3,4-dimethyl-6-pyridazonyl-1)acetate*

By the procedure used to prepare ethyl β-(3-methyl-6-pyridazonyl-1) propionate (Example 6), 3,4-dimethyl-6-pyridazone and ethyl bromoacetate gave ethyl (3,4-dimethyl-6-pyridazonyl-1) acetate in 69% yield boiling at 130° C. (0.2 mm.).

*Example 16.—Ethyl (3,4,5-trimethyl-6-pyridazone-1)acetate*

To a solution of sodium (4.6 g., 0.2 mole) in 200 ml. of absolute ethanol there was added 3,4,5-trimethyl-6-pyridazone (27.6 g., 0.2 mole). This solution was stirred at less than 10° C. while ethyl bromoacetate (33.4 g., 0.2 mole) was added dropwise. After the addition was complete the reaction mixture was heated under reflux for one hour. An additional 100 ml. of absolute ethanol was added and the boiling mixture was filtered to remove sodium bromide. The filtrate was chilled giving 24 g. (54% yield) of material melting at 122–126° C.

*Example 17.—Ethyl (3-ethyl-6-pyridazonyl-1)acetate*

By the procedure used to prepare ethyl β-(3-methyl-6-pyridazonyl-1) propionate (Example 6), 3-ethyl-6-pyridazone and ethyl bromoacetate gave ethyl (3-ethyl-6-pyridazonyl-1)acetate in 70% yield boiling at 110–111° C. (0.09 mm.). This material later crystallized and melted at 48–50° C.

*Example 18.—Ethyl (3-phenyl-6-pyridazonyl-1)acetate*

By the procedure used to prepare ethyl (3,4,5-trimethyl-6-pyridazonyl-1)-acetate (Example 16), 3-phenyl-6-pyridazone [Ber., 32, 395 (1899)] and ethyl bromoacetate gave ethyl (3-phenyl-6-pyridazonyl-1)acetate in 66% yield melting at 100–102° C.

*Example 19.—Ethyl 3-(p-bromophenyl)-6-pyridazonyl-1-acetate*

By the procedure used to prepare ethyl (3,4,5-trimethyl-6-pyridazonyl-1) acetate (Example 16), 3-(p-bromophenyl)-6-pyridazone [J. A. C. S. 75, 1117 (1953)], and ethyl bromoacetate gave ethyl 3-(p-bromophenyl)-6-pyridazonyl-1-acetate in 53% yield melting at 171–172° C.

PREPARATION OF HYDRAZIDES

All of the hydrazides of my invention were prepared by heating the corresponding ester with a slight excess of hydrazine hydrate in a solvent, usually ethanol, after which the solvent was removed under vacuum and the residue was crystallized from a suitable solvent. Certain of the esters with higher molecular weights or with a greater amount of steric hindrance required higher temperatures for the reaction to proceed. These reactions were carried out in n-propanol. Examples of the hydrazides of my invention with pertinent data concerning preparation and properties, are listed in Table I.

Table I.—Hydrazides

| Example No. | Name of Hydrazide | Reaction Temp., °C. | Reaction Time (Hrs.) | Recrystn. Solvent | M. P., °C. | Percent Yield |
|---|---|---|---|---|---|---|
| 20 | 6-Pyridazonyl-1-acetic | 80 | 3 | Aqueous ethanol | 213–216 | 72 |
| 21 | 3-Methyl-6-pyridazonyl-1-acetic | 80 | 1 | ...do... | 199–200 | 88 |
| 22 | β-(3-Methyl-6-pyridazonyl-1) propionic | 80 | 2 | Ethanol | 151–153 | 80 |
| 23 | ω-(3-Methyl-6-pyridazonyl-1) undecanoic | 120 | 24 | Benzene Skellysolve B | 85–87 | 18 |
| 24 | α-(3-Methyl-6-pyridazonyl-1) propionic | 80 | 1 | Ethanol | 134.5–135 | 65 |
| 25 | α-(3-Methyl-6-pyridazonyl-1) butyric | 80 | 6 | Benzene | 125.5–127 | 77 |
| 26 | α-(3-Methyl-6-pyridazonyl-1) valeric | 80 | 4 | ...do... | 112–115 | 44 |
| 27 | α-(3-Methyl-6-pyridazonyl-1) heptanoic | 80 | 24 | Benzene Skellysolve B | 108–109 | 53 |
| 28 | α-Phenyl-α-(3-methyl-6-pyridazonyl-1) acetic | 130 | 24 | Ethanol | 191–192 | 79 |
| 29 | α-(3-Methyl-6-pyridazonyl-1) isobutyric | 120 | 65 | ...do... | 165–166 | 22 |
| 30 | 5-Methyl-6-pyridazonyl-1-acetic | 80 | 12 | Aqueous Ethanol | 203–204.5 | 73 |
| 31 | 3,5-Dimethyl-6-pyridazonyl-1-acetic | 80 | 2 | Ethanol | 194–196 | 44 |
| 32 | 3,4-Dimethyl-6-pyridazonyl-1-acetic | 80 | 5 | Aqueous Ethanol | 205–206 | 78 |
| 33 | 3,4,5-Trimethyl-6-pyridazonyl-1-acetic | 80 | 12 | ...do... | 217–221 | 79 |
| 34 | 3-Ethyl-6-pyridazonyl-1-acetic | 80 | 4 | Ethanol | 170–171 | 65 |
| 35 | 3-Phenyl-6-pyridazonyl-1-acetic | 80 | 2 | Water | 211–213 | 75 |
| 36 | 3-(p-Bromophenyl)-6-pyridazonyl-1-acetic | 100 | 4 | Ethanol | 223–226 | 56 |

I claim:

1. A compound having the structural formula

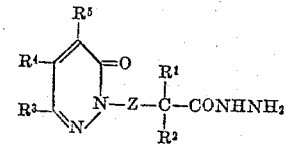

wherein $R^1$ denotes a member selected from the group consisting of hydrogen and lower alkyl $R^2$ denotes a member selected from the group consisting of hydrogen, lower alkyl and phenyl $R^3$ denotes a member selected from the group consisting of hydrogen, halogen, lower alkyl, phenyl and halophenyl $R^4$ denotes a member selected from the group consisting of hydrogen and lower alkyl $R^5$ denotes a member selected from the group consisting of hydrogen and lower alkyl; and Z denotes a member selected from the group consisting of a direct linkage and an alkylene chain of not more than 20 carbon atoms 2. ω-(3-methyl-6-pyridazonyl-1)undecanoic hydrazide.
3. α-(3-methyl-6-pyridazonyl-6-pyridazonyl-1)-propionhydrazide.
4. α-Phenyl-α-(3-methyl-6-pyridazonyl-1)acethydrazide.
5. 3,4,5-trimethyl-6-pyridazonyl-1-acethydrazide.
6. 3-(p-bromophenyl)-6-pyridazonyl-1-acethydrazide.
7. The process of preparing the compounds of claim 1 which comprises reacting hydrazine with a composition of the following structural formula

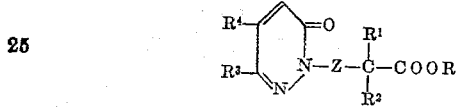

wherein R denotes lower alkyl and $R^1$, $R^2$, $R^3$, $R^4$, $R^5$ and Z are as defined in claim 1.

8. The process of preparing the compounds of claim 1, which comprise reacting a pyridazone of the following structural formula

with an ester of the following formula

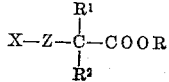

in the presence of an alkali metal alkoxide, and thereafter reacting the resulting product with hydrazine, wherein R denotes lower alkyl, X denotes halogen, and $R^1$, $R^2$, $R^3$, $R^4$, $R^5$ and Z are as defined in claim 1.

No references cited.